No. 618,046. Patented Jan. 17, 1899.
A. L. GOODMAN.
APPARATUS FOR DISPENSING ICE CREAM.
(Application filed Jan. 17, 1898.)
(No Model.)
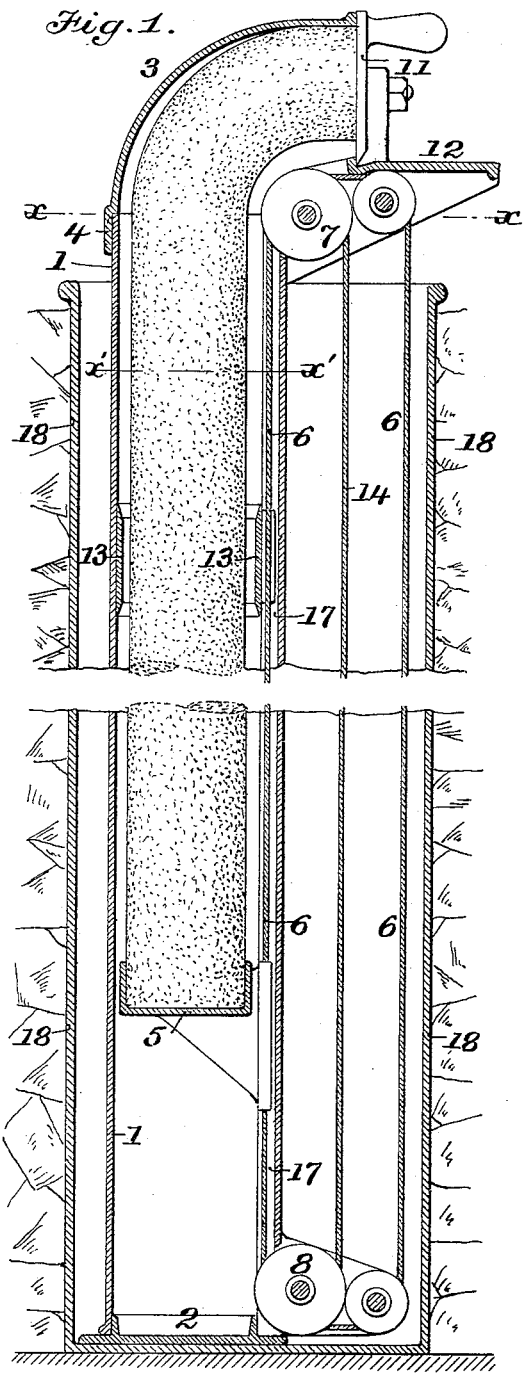
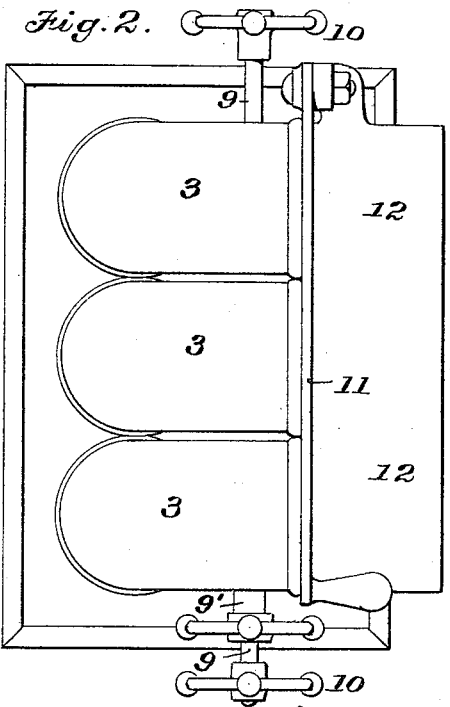
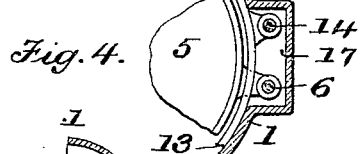
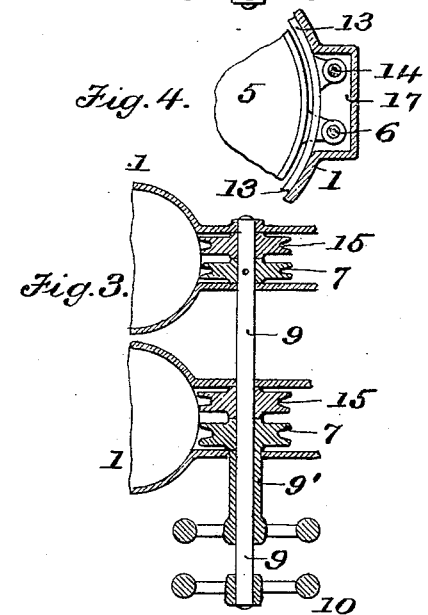
Attest:
James Lavallie
M. H. Holmes.
Inventor:
Abe L. Goodman,
by Robert Burns Att'y.

UNITED STATES PATENT OFFICE.

ABE L. GOODMAN, OF CHICAGO, ILLINOIS.

APPARATUS FOR DISPENSING ICE-CREAM.

SPECIFICATION forming part of Letters Patent No. 618,046, dated January 17, 1899.

Application filed January 17, 1898. Serial No. 666,963. (No model.)

*To all whom it may concern:*

Be it known that I, ABE L. GOODMAN, a citizen of the United States, residing at Chicago, in the county of Cook and State of Illinois, have invented certain new and useful Improvements in Apparatus for Dispensing Ice-Cream; and I do hereby declare the following to be a full, clear, and exact description of the same, reference being had to the accompanying drawings, forming a part of this specification.

The present invention relates to an apparatus for dispensing ice-cream and the like at soda-fountains and other places in a convenient manner.

The object of the present improvements is to provide a simple, durable, and effective apparatus for such uses and in which the ice-cream is delivered in accurate quantities in a simple and convenient manner and with which different varieties of cream can be conveniently dispensed at the will of the clerk, and while not being dispensed the ice-cream is kept in a proper frozen condition and any liability to thawing and running of the same during the time it is awaiting dispensation is prevented in a very perfect and efficient manner. I attain such objects by the construction and arrangement of parts illustrated in the accompanying drawings, in which—

Figure 1 is a vertical sectional elevation of an apparatus embodying the present invention; Fig. 2, a top plan of the same; Fig. 3, a horizontal section at line $x\ x$, Fig. 1; Fig. 4, an enlarged detail horizontal section at line $x'\ x'$, Fig. 1.

Similar numerals of reference indicate like parts in the several views.

Referring to the drawings, 1 represents an upright casing or conduit of a circular or other suitable shape in cross-section and formed with an open lower end, closed by a removable cap or head 2.

3 is a curved or gooseneck outlet, removably attached to the upper end of the conduit 1 by means of a slip-joint 4 or other usual means of attachment.

5 is a cup-shaped carrier arranged within the conduit 1 and adapted to receive the lower end of an elongated roll or body of ice-cream, frozen ices, &c., and support the same within the interior of the conduit.

Motion is communicated to the carrier 5 in a positive manner and in either direction by means of a flexible connection 6, such as a rope or cable passing over sheaves or pulleys 7 and 8 at the opposite ends of the conduit, as shown. Motion is conveniently imparted to the said carrier in an easy and convenient manner by means of a laterally-projecting shaft 9, to which the upper sheave or pulley 7 is fixedly secured, and which shaft is provided with an operating hand-wheel 10.

In cases where a series of two or more of the conduits are employed to deliver frozen ices of different flavors such conduits will be arranged side by side, and the operating-shaft 9 of the innermost conduit may extend through the central portion of a tubular shaft 9', that carries the operating sheave or pulley of the outermost conduit. By this means the operating hand-wheels can be placed adjacent to each other convenient to the operator and yet capable of separate and independent operation.

With the present invention the rolls of frozen ices are furnished in the form of elongated rolls or bodies, have a less diameter than the conduit, and are adapted to be inserted therein by a removal of the gooseneck-outlet 3, when the roll of frozen ice can be lowered into the interior of the conduit, with its lower end resting in and supported by the carrier 5. The gooseneck-outlet 3 can then be replaced, after which the apparatus is ready for use.

11 is a cutter arranged in front of the outlet-opening of the gooseneck 3, that is adapted to sever a protruding portion of the frozen cream, which severed portion of the same is received upon a shelf or table 12, arranged below and in front of the said cutter and which may be graduated, so as to afford an indication or guide to the operator in serving any stated quantity of the frozen ices.

In the construction shown in the drawings a single cutter is used in common for a series of three dispensing-conduits. It is, however, within the province of the present invention to use separate or individual cutters for each conduit and to use any usual form of cutter other than the pivoted one shown, the only requirement being in the present invention that said cutter shall close the mouth of the gooseneck-outlet when not in use, so that the heated air of the room shall not have access to the frozen ices to cause the same to thaw and run. It will be observed that with the present improved construction the roll of frozen cream can be lowered after each dispensing operation down into the chilled lower portion of the conduit, so that thawing thereof is prevented in a very perfect and efficient manner.

13 is a cutter or clearer arranged within the interior of the conduit and fitting the interior of the same and adapted to cut the roll of frozen ice-cream from the interior surface of the conduit in case such roll should become accidentally frozen thereto. This cutter has motion imparted to it in a positive manner and in either direction by means of a flexible connection 14, such as a rope or cable passing over sheaves or pulleys 15, that turn loosely upon the shafts of the sheaves for the endless connection 6, by which the carrier 5, heretofore described, is operated. In use the operator will grasp the exposed portion of the endless flexible connection 14 to impart motion to the same and to the said cutter 13.

In order that the endless flexible connections 6 and 14 will not be in the way of the movements of the carrier 5 or the cutter 14, the said connections will be arranged within a longitudinal recess or bead 17 at one side of the conduit 1, as illustrated in Figs. 1 and 4.

18 is a close-bottomed tank that is adapted to receive and house the series of delivery apparatus above described and protect the same from the direct contact of the salted ice with which said tank 18 is surrounded, and which salted ice is contained in another tank or tub that in turn incloses the tank 18.

Having thus fully described my said invention, what I claim as new, and desire to secure by Letters Patent, is—

1. In an apparatus for dispensing ice-cream and the like, the combination of a conduit adapted to contain a loose roll of frozen ice-cream, a carrier engaging and supporting the lower end of said roll and means for operating said carrier, substantially as set forth.

2. In an apparatus for dispensing ice-cream and the like, the combination of a conduit adapted to contain a loose roll of frozen ice-cream, a carrier engaging and supporting the lower end of said roll, and means for operating said carrier, the same comprising an endless flexible connection carried upon pulleys at each end of the conduit, substantially as set forth.

3. In an apparatus for dispensing ice-cream and the like, the combination of a conduit having a detachable gooseneck at its upper end, and adapted to contain a loose roll of frozen cream, a carrier engaging and supporting the lower end of said roll, and means for operating said carrier, substantially as set forth.

4. In an apparatus for dispensing ice-cream and the like, the combination of a conduit having a detachable gooseneck at its upper end, and adapted to contain a loose roll of frozen cream, a carrier engaging and supporting the lower end of said roll, and means for operating said carrier, the same comprising an endless flexible connection carried upon pulleys at each end of the conduit, substantially as set forth.

5. In an apparatus for dispensing ice-cream and the like, the combination of a conduit having a detachable gooseneck at its upper end, and adapted to contain a loose roll of frozen cream, a carrier engaging and supporting the lower end of said roll, a cutter having movement within said conduit, and means for operating said carrier and cutter, substantially as set forth.

6. In an apparatus for dispensing ice-cream and the like, the combination of a conduit having a detachable gooseneck at its upper end, and adapted to contain a loose roll of frozen cream, a carrier engaging and supporting the lower end of said roll, a cutter having movement within said conduit, and means for operating said carrier and cutter, the same comprising endless flexible connections carried upon pulleys at each end of the conduit, substantially as set forth.

7. In an apparatus for dispensing ice-cream and the like, the combination of a conduit having a detachable gooseneck at its upper end, and adapted to contain a loose roll of frozen cream, a carrier engaging and supporting the lower end of said roll, a cutter arranged at the outlet of the gooseneck, and means for operating said carrier, substantially as set forth.

8. In an apparatus for dispensing ice-cream and the like, the combination of a conduit having a detachable gooseneck at its upper end, and adapted to contain a loose roll of frozen cream, a carrier engaging and supporting the lower end of said roll, a cutter arranged at the outlet end of the gooseneck, and means for operating said carrier, the same comprising an endless flexible connection carried upon pulleys at each end of the conduit, substantially as set forth.

9. In an apparatus for dispensing ice-cream and the like, the combination of a conduit adapted to contain a loose roll of frozen ice-cream, and formed with a longitudinal bead or recess a carrier supporting the lower end of said roll, a flexible operating connection, attached to said carrier and arranged in said bead or recess, substantially as set forth.

In testimony whereof witness my hand this 15th day of January, 1898.

ABE L. GOODMAN.

In presence of—
ROBERT BURNS,
JAMES LAVALLIN.